Aug. 17, 1954  J. M. KLOVER  2,686,458
INDEXING MACHINE
Filed March 13, 1952  4 Sheets-Sheet 1

INVENTOR.
JOHN M. KLOVER
BY
HIS ATTORNEYS

Aug. 17, 1954   J. M. KLOVER   2,686,458
INDEXING MACHINE
Filed March 13, 1952   4 Sheets-Sheet 2

INVENTOR.
JOHN M. KLOVER
HIS ATTORNEYS.

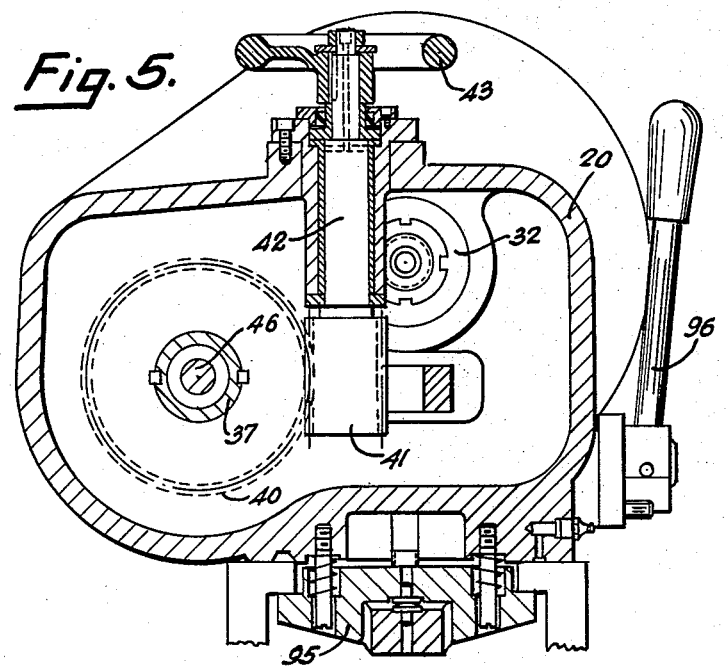
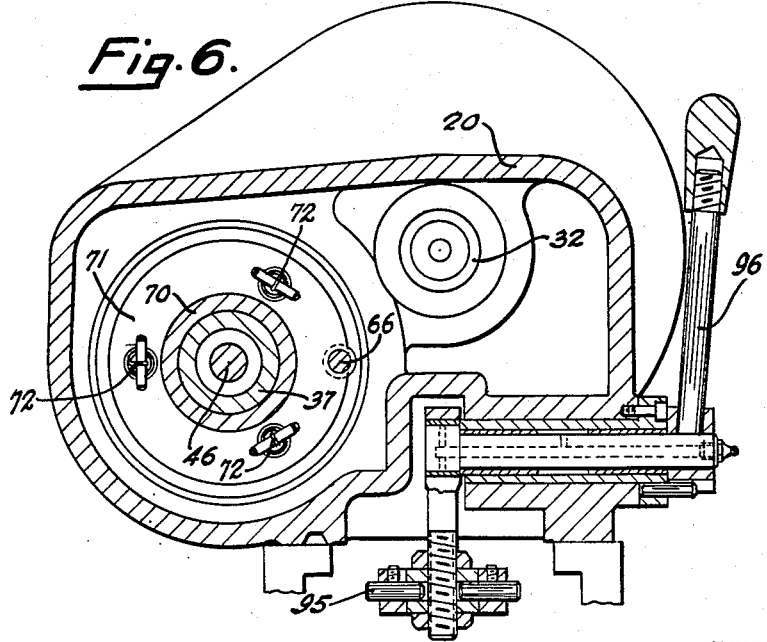

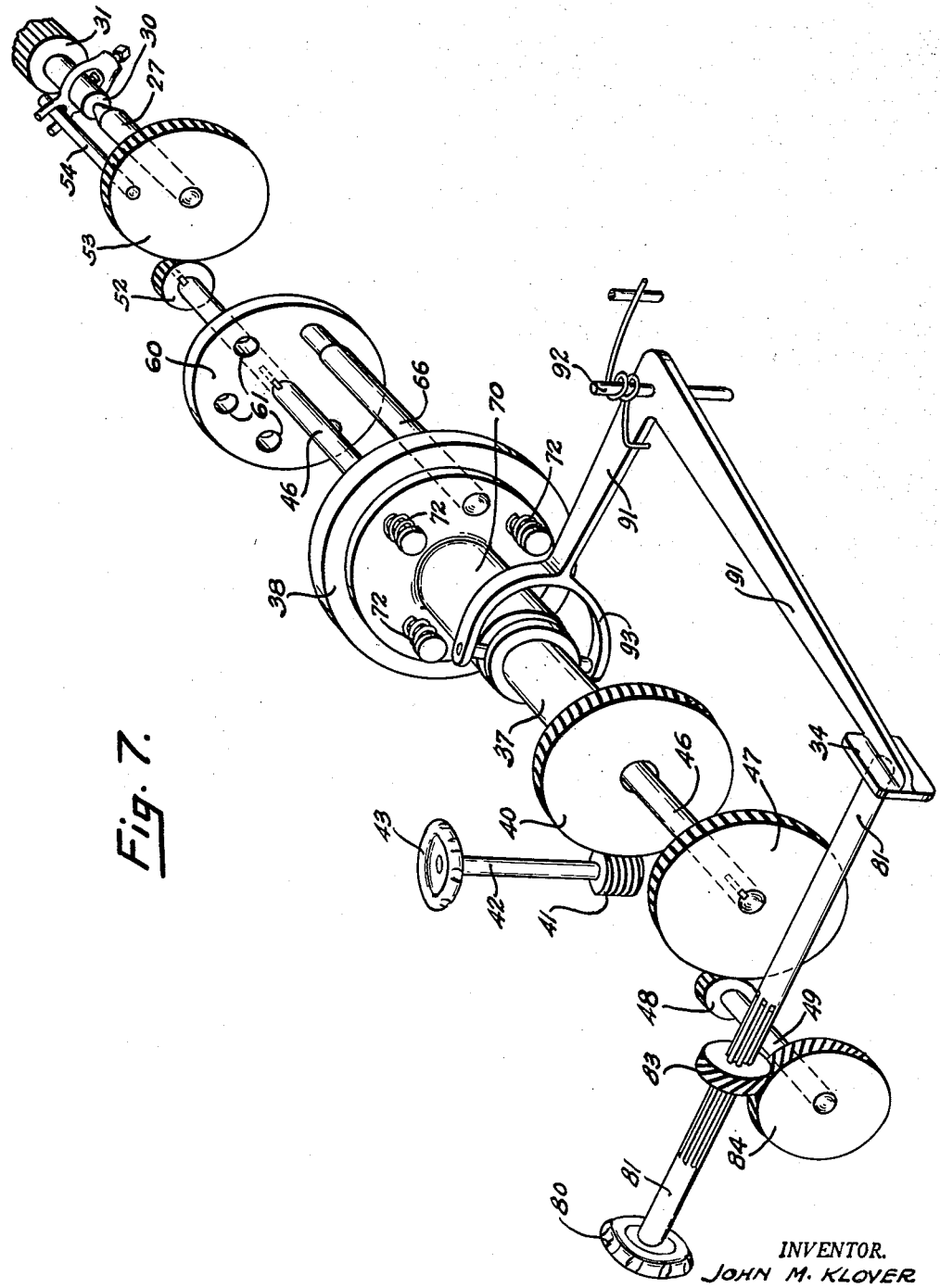

Patented Aug. 17, 1954

2,686,458

UNITED STATES PATENT OFFICE 2,686,458

INDEXING MACHINE

John M. Klover, Xenia, Ohio, assignor to General Motors Corporation, Detroit, Mich., a corporation of Delaware Application March 13, 1952, Serial No. 276,423

7 Claims. (Cl. 90—57)

This invention relates to a machine for rotatably indexing a work-piece.

It is among the objects of the present invention to provide a machine to which a work-piece may be attached and which may be operated, first to rotate said work-piece through a predetermined aliquot part of a complete revolution and then through any desirable fraction of a revolution to obtain micrometric adjustments.

Another object of the present invention is to provide a machine as aforedescribed in which the micrometric adjustments do not encroach upon range of movement of the work-piece through its measured aliquot part of a complete revolution but on the contrary each predetermined indexing movement of the work-piece is started from the point at which said work-piece was previously set by the micrometric adjustment.

Further objects and advantages of the present invention will be apparent from the following description reference being had to the accompanying drawings wherein a preferred embodiment of the present invention is clearly shown.

In the drawings:

Fig. 5 is a sectional view taken along the line and in the direction of the arrows 5—5 in Fig. 1;

Fig. 6 is a sectional view taken along the line and in the direction of the arrows 6—6 in Fig. 1;

Fig. 7 is a schematic view, in perspective, showing the various cooperating elements of the machine.

Figure 1:
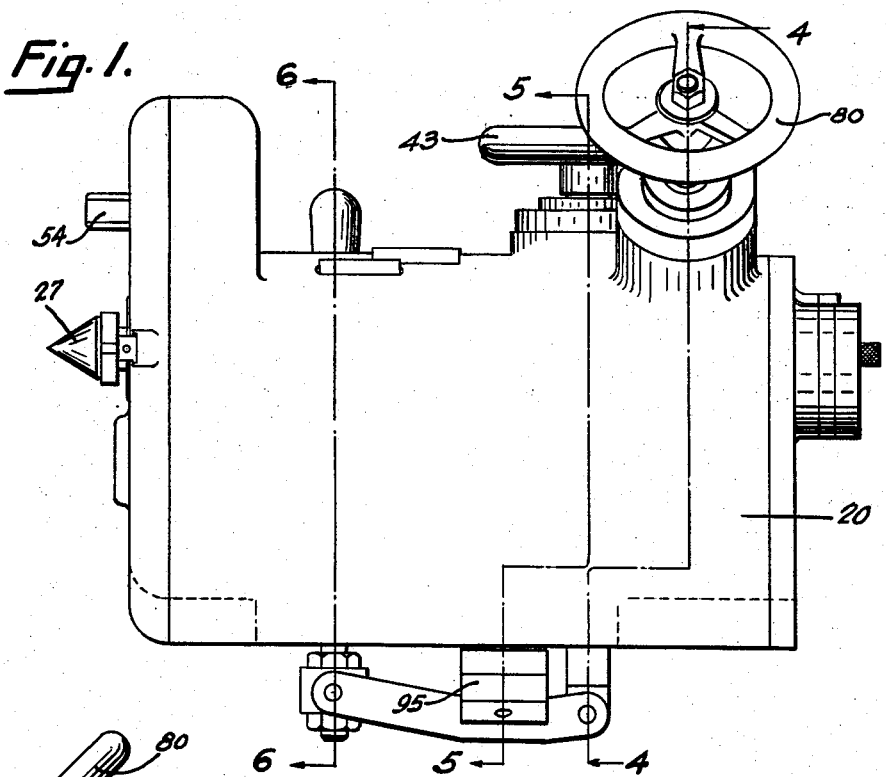
Fig. 1 is a side view of the machine.
Figure 2:
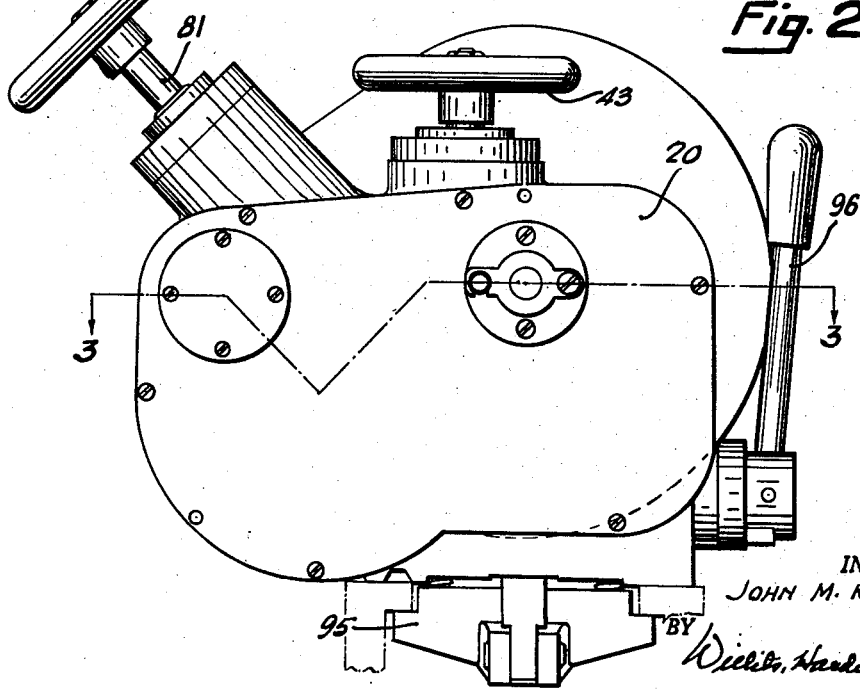
Fig. 2 is an end view of the machine.

Although the present machine is adapted to have any sort of work-piece attached thereto for the purpose of rotatively indexing said work-piece relatively to a machine tool, the present drawings show the machine as particularly adapted to receive an armature. This indexing machine is attachable to another machine which has a saw for undercutting the mica separators between the copper bars of the commutator of the armature. The particular armature for which this machine is adapted has 41 segmental copper bars with mica separators between said bars. Therefore it is necessary to rotate the armature $1/41$ of a complete revolution in order to move each mica separator into alignment with the saw.

This sort of an indexing of the armature would be satisfactory if the segmental metal bars and their mica separators would be of the exact dimensions in every commutator. However, the dimensions of these segmental bars and separators vary, especially their transverse dimensions will not be exactly alike in all instances and therefore the 41 spaces in the present armature will not always be of the same width. Consequently this type of indexing would not always bring the mica separator in proper alignment with the saw for undercutting the mica. In undercutting the mica separators in a commutator it is particularly essential not to engage and cut away the metal commutator bar. In fact to avoid such contact with the metal commutator bars it has been the practice to use saws or undercutting tools of lesser thickness than the thickness of the mica separator and after an undercutting operation the remaining side portions of the mica are removed by scraping or the like which necessitates extra, time consuming labor. In production it was found that when the saw was permitted to engage the copper bars, the life of the saw was substantially reduced thereby requiring many time-consuming replacements of the saw in the undercutting machine. However, where the saw is slightly narrower than the width of the mica and in operation cuts away the greater portion of the mica separator and does not engage the copper bar, the life of the saw is greatly extended. Thus, it is important that an index machine of this kind perfectly aligns the mica separator with the saw, so that the metal bar is not contacted.

In the present machine the armature is indexed by separately operative mechanisms. One mechanism for indexing the armature through a predetermined, aliquot portion of an entire revolution thereof—in this instance $1/41$ of a revolution is operated by an actuator which may be manually rotated and also manually moved in a longitudinal, axial direction. A retaining device is provided in this machine which locks the machine in an indexed position. The actuator when manually operated longitudinally, axially effects unlocking of the mechanism so that rotation of this actuator will, through suitable gearing, rotate the armature attached to the machine. As soon as the actuator is being rotated the operator may permit return of said actuator to its normal longitudinal axial position in which the locking device is rendered effective again to lock the machine against rotation when, by rotational operation of the actuator, the machine has moved the armature through $1/41$ part of a complete revolution which in this instance is the predetermined aliquot portion of one revolution of the work-piece. If upon close examination by any suitable telescopic means it is found that the mica separator does not exactly align with the saw to undercut said mica separator, then a second actuator in this machine may be operated rotatably in order to make a micrometric index of the work-piece or armature in either direction in order to correct for any variations in the spacing of the separator segments in the armature attached to the machine.

Figure 3:
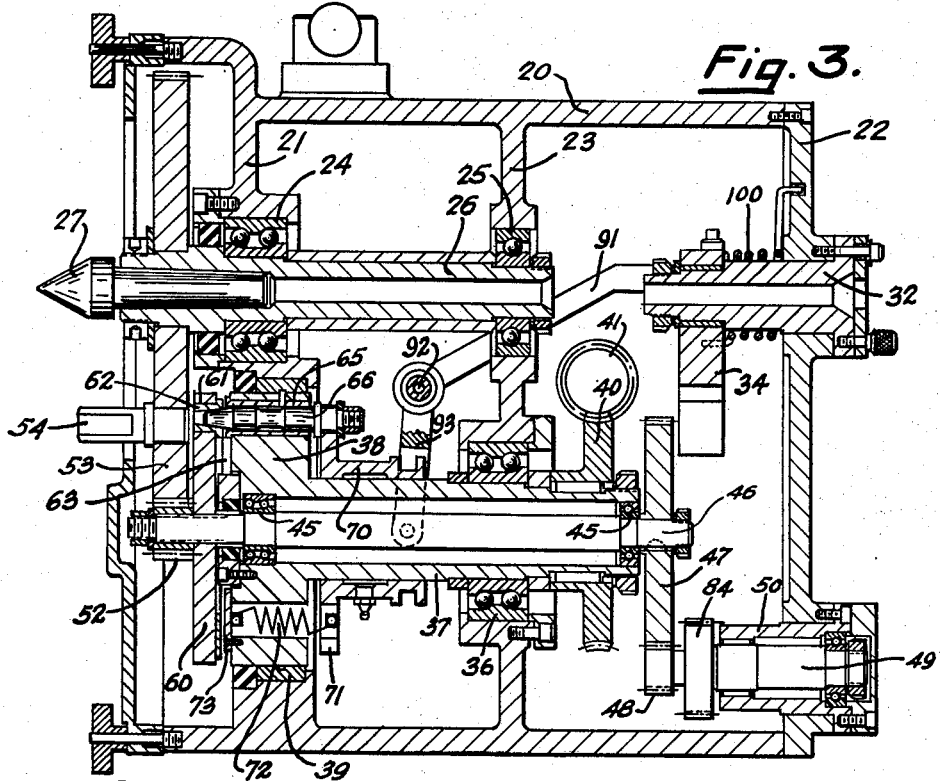
Fig. 3 is a sectional view taken substantially along the line and in the direction of the arrows 3—3 in Fig. 2.
Figure 4:
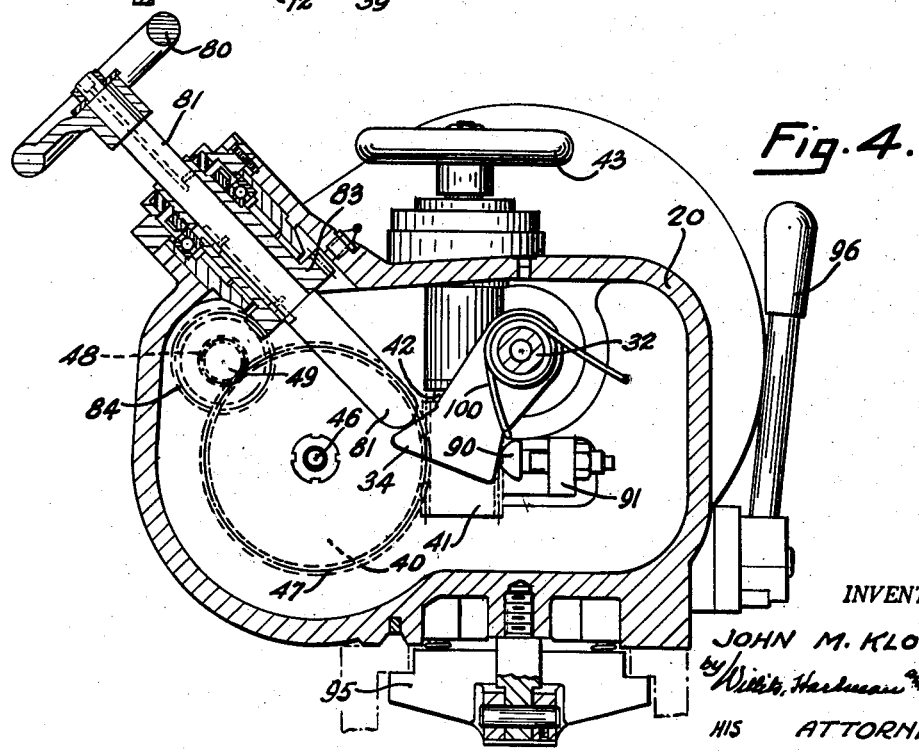
Fig. 4 is a sectional view taken substantially along the line and in the direction of the arrows 4—4 in Fig. 1.

Referring to the drawings and particularly Figs. 3, 4 and 7 thereof, the machine consists of a housing 20, having one integral end wall 21 and a removable end wall 22 attached to the housing in any suitable manner. Between these end walls the housing has an inner partition 23. Aligned ball bearings 24, and 25, supported in the respective walls 21 and 23 of the housing, rotatably support a hollow shaft 26, one end of which extends beyond the wall 21 to the exterior of the housing. In the outer end of the hollow shaft 26 there is provided a center spindle 27 adapted to centrally engage and support the shaft 30 of the work-piece or armature 31. The wall 22 of the housing supports a hollow stub shaft 32 which is in coaxial alignment with the hollow shaft 26 so that a rod may be inserted in both members 32 and 26 to knock out the center spindle 27 when desired. This hollow stub shaft 32 supports an intermediate cam member 34 so as to be rotatable thereon the function of which will be detailedly described.

Another ball bearing 36 supported in the partition 23 within the housing provides a journal for the tubular extension 37 of the carrier 38, said carrier being in the form of a disc which is rotatably supported by a ring bearing 39 secured in the integral end wall 21 of the housing. The one end of the tubular end of the tubular extension 37 of the carrier 38 has a worm gear 40 keyed thereto, said worm gear 40 operatively engaging the worm 41 which is attached to the rod 42 journalled in and extending outside the housing 20 and having the handwheel 43 attached thereto. This handwheel 43 may be termed the "one actuator" of the indexing machine. When the actuator 43 is rotated it will rotate the carrier 38 through worm 41 and its engaging gear 40. However, the worm gear connection between the actuator or handwheel 43 and the carrier 38 will prevent rotation of the actuator 43 by the carrier 38 and thus it may be said that this actuator is operative to rotate the carrier, but the carrier can not be turned otherwise due to the worm gear connection with said actuator 43. At each end of the carrier 38, which is hollow, there is provided a ball bearing 45 for rotatably supporting the shaft 46 concentrically of said carrier 38. At the end of the shaft 46 adjacent the worm gear 40 there is attached a spur gear 47 meshing with a pinion 48 which pinion is secured to the inner end of a stub shaft 49 rotatably supported in a sleeve 50 which is carried in the removable end wall 22 of the housing in any suitable manner. The opposite end of the shaft 46 has a pinion 52 secured thereto which meshes with a spur gear 53 secured to the tubular shaft 26. A rotary motion transmitting element or pin 54 is provided on the gear 53, said pin 54 serving as a driving connection engageable with the work-piece or armature 31 rotatably supported by the pivot centering pin or spindle 27. Fig. 7 illustrates how the armature 31 in this instance is drivingly connected with the spur gear 53 through the driving pin 54.

Adjacent the pinion 52 shaft 46 has a disc 60 operatively attached thereto, said disc being in juxtaposition to the carrier 38 and of substantially the same diameter as said carrier. A plurality of holes or openings 61 are provided in plate 60, said openings being arranged in a circular row concentric of the shaft 46 and equally spaced so that when the disc 60 is rotated through an arc equal to the spacing between adjacent openings 61 in said disc, the pinion 52 and gear 53 will have moved the armature through the predetermined aliquot portion of an entire revolution of the armature attached thereto. Each one of these openings has a thimblelike insert 62 and arcuate segments 63 are attached to the disc 60 between adjacent inserts in order to form a circular track on said disc 60, between adjacent inserts 62 and facing the carrier 38.

The carrier has a plurality of holes therethrough one of which is provided with a sleeve bearing 65 in which a detent or locking pin 66 is slidably supported. The end of said detent pin 66 adjacent the disc 60 is tapered so that said tapered end of pin 66 may enter into the respective thimbles 62 in the disc 60 as said disc is rotated, thereby limiting the rotation of said disc to the predetermined aliquot portion of an entire revolution thereof and consequently doing the same for the armature operatively connected with said disc through the pinion and gear 52 and 53 respectively.

A collar 70 is slidably mounted upon the tubular extension 37 of the carrier 38, said collar having an outwardly extending annular flange 71 to which one end of the detent pin 66 is secured. A spring 72 in each of the ramining openings in the carrier 38 has one end anchored to the flange 71 of the carrier 70 the other end of each spring being secured to an abutment plate 73 attached to the face of the carrier 38 adjacent the disc 60. These springs yieldably urge the collar 70 toward the carrier 38 and thus collar 70 urges the pin 66 into engagement with the annular track provided between the thimbles 62 by the interposed segmental elements 63, so that when an opening in a thimble 62 aligns with the pin 66 said pin is urged to enter said thimble and thereby lock the disc 60 against rotation and in proper position to align or index the armature in a position in which the undercutting saw may engage and undercut the mica segment between the metallic segments of the commutator of the armature.

A second annular operable actuator is provided in the machine, the handwheel of this actuator being designated by the numeral 80. Handwheel 80, as clearly shown in Figs. 4 and 7, has a shaft 81 attached thereto which is journalled in housing 20 and slidably keyed to the helical pinion 83 operatively engaging gear 84. Gear 84 is mounted upon the stub shaft 49 to which the pinion 48 is also attached, said pinion 48 operatively engaging the gear 47 mounted upon the shaft 46. Thus, it will be seen that when the handwheel 80 of the second actuator is rotated manually, shaft 81 and its pinion 83 will be rotated, pinion 83 rotating gear 84, shaft 49 and pinion 48 resulting in a rotation of gear 47, and its attached shaft 46. Also, as previously described, shaft 46 has the disc 60 attached thereto and therefore when said disc 60 is locked against rotation by the engagement thereof by detent pin 66, the second actuator 80 can not be rotated against this locking effect by the pin 66. The end of the rod or shaft 81 attached to the handwheel 80 of the actuator engages a motion translating cam 34 which is rotatably supported upon the stud shaft 32, as shown in Fig. 3. This motion translating cam 34 engages a mushroom-shaped button 90 secured to the end of lever 91 which is pivotally supported by a pin 92 carried in the housing in any suitable manner. The end of lever 91 has a yoke portion 93 which operatively engages the collar or sleeve 70 slidable on the tubular extension 37 of the carrier 38. This leverage connection between the shaft 81 of the second actuator wheel 80 and the slidable collar 70 will cause said collar to be shifted away from the carrier 38 to move the locking pin 66 out of locking engagement with the detent thimble 62 in disc 60 when the second actuator 80 is moved longitudinally axially so that the shaft 81 slides through the attached helical pinion 83 thereon.

Any suitable clamping mechanism as shown at 95 in the drawings may be employed adjustably to secure the indexing machine upon any other machine with which it is adapted to be used; the clamping mechanism to be controlled by a hand lever 96.

Workpieces requiring intermittent adjustment or indexing through various degrees of the predetermined aliquot parts of a complete revolution may be accommodated in the present machine by a change in the gearing and a change in the number and spacing of the openings in the disc 60. In the present instance where the workpiece is an armature having 41 commutator bars the disc 60 is provided with six equally spaced holes or thimbles arranged in a circular row concentric of the disc cooperating with gearing of a predetermined ratio whereby the rotation of the disc through an arc of movement equal to the spacing of the thimbles therein will effect rotation of the armature through $\frac{1}{41}$ part of a complete revolution.

To operate this machine the armature is secured to the centering pin 27 and the driving gear 53 in a manner, as shown in Fig. 7, and so that one mica separator between two adjacent metallic bars of the commutator aligns with the saw of the machine, not illustrated, adapted to undercut the mica. To make the $\frac{1}{41}$ index of the armature commutator in order that the next adjacent mica aligns with the saw, the operator moves the actuator 80 longitudinally axially so that through the linkage connection including shaft 81, motion translating cam 34 and the pivoted lever 91, the collar 70 will be slid lengthwise of the supporting tubular portion 37 of the carrier 38 to retract the locking pin 66 from engagement with the thimble 62 in the index disc 60 thereby to unlock and release said index disc. While the actuator 80 is held in the depressed position maintaining the pin 66 in its retracted position, said actuator is rotated thereby rotating shaft 46 through the gearing 83, 84, 48 and 47 which in turn will rotate the index disc 60 to move the thimble 62 out of alignment with the detent pin 66. Now the longitudinally axial pressure on the actuator 80 may be discontinued and under the effect of spring 100 the actuator 80 is returned to its normal out position in which continued rotation thereof will effect continued rotation of the disc and consequently rotation of the work-piece through pin 52 and the driving gear 53 carrying with it the driving pin 54 engaging the work-piece. As the disc 60 is being rotated and the spring 72 having moved the collar 70 into its normal position the pin 66 is maintained in sliding engagement with the continuous track formed by the arcuate plate elements 63 interposed between adjacent thimbles, so that when the disc 60 is moved to align the next adjacent thimble with the pin 66 said pin will be projected into the said next adjacent thimble again to lock the disc 60 in this new position. Now the next adjacent mica separator should be in proper alignment with the undercutting saw. Repetition of these operations will move each succeeding mica separator into saw alignment providing the commutator bars and segments are all of identical width or thickness. Where the thickness of such bars and separators vary the indexing done by the operation of the actuator 80 in cooperation with the indexing disc 60 will at times not move the mica bar to be undercut into direct alignment with the undercutting saw but on the contrary a portion of the metal bar will be in line with the saw which, if the cycle is completed, would cut away a portion of the metal commutator bar, an undesirable result in the commercial production of commutators. Where the operator observes through any suitable visual checking device, such as a telescopic lens or the like, that the mica separator is not in proper alignment with the saw, then the operator rotates the actuator 43 which, being connected with the carrier 38 through the worm 41 and worm gear 40 and with the index disc 60 through the detent pin 66 extending into the thimble in said disc, will rotate said disc and subsequently the work-piece or armature 31 through pinion 52 and the driving gear 53. The actuator 43 may be rotated in one direction or the other to rotate the armature in one direction or the other. Ordinarily this indexing by the actuator 43 is of a micrometric character requiring a minimum rotary movement of the armature to bring the mica separator of the commutator into direct alignment with the undercutting saw so that said saw will engage and cut away only the mica not touching the metallic bars on either side thereof.

It will be noted that after a micrometric adjustment of the armature or work-piece has been made by the operation of the actuator 43, the next index made by operation of the actuator 80 will start from the point in which the disc 60 was positioned by the micrometric adjustment through the operation of the actuator 43. Thus succeeding indexing operations are all made from the last position of the detent pin 66 and will so be continued until the operator again observes that the micrometer adjustment is necessary to compensate for variations and again bring separator segments into proper alignment with the undercutting saw. This arrangement is provided because where one commutator bar or separator is of improper transverse dimension or thickness, other following bars being of the proper transverse dimension will require the predetermined indexing distance all starting from the abnormally wide bar or separator. If a fixed index were obtained throughout the entire processing of the work-piece then discrepancies as they occur would be added one to another finally amounting to an unacceptable indexing of the work-piece as it approaches its final operation.

While the embodiment of the present invention as herein disclosed, constitutes a preferred form, it is to be understood that other forms might be adopted.

What is claimed is as follows:

1. An indexing machine for rotatably indexing a work-piece, said machine consisting of a rotatable member with which a workpiece is adapted to be operatively connected; a manually rotatable gear train operatively connected to said rotatable member for driving it and including an indexing plate; a manually rotatable carrier plate having locking means yieldably urged into locking engagement with said indexing plate to lock said gear train against rotation relative to said carrier plate; a manually operable member drivingly connected to said gear train and operatively connected to said locking means, said manually operable member being movable in one direction to first actuate the locking means for releasing the indexing plate after which said manually operable member is rotatable to rotate said indexing plate relative to said locking means and said carrier plate until the locking means again is effective to lock the indexing plate against movement; and a second manually rotatable member operatively connected to the said carrier plate to rotate said indexing plate through said locking means upon rotation of said carrier plate.

2. An indexing machine for rotatably indexing a work-piece, said machine consisting of a rotatable element with which a workpiece is adapted to be operatively connected; a member manually operable rotatably and axially, said member being operatively connected to said element by a gear train including a rotatable disc provided with a plurality of predeterminately spaced detents arranged in an annular row; a rotatable carrier coaxial of said disc and normally held against rotation, said carrier including a locking element yieldably urged to engage a detent on the rotatable disc for locking said disc against rotation; means operatively connecting the manually operative member with the locking element for moving said element to release the disc in response to actuation of the manually operative member longitudinally of its axis whereafter rotation of said member rotates said disc and the rotatable element until the locking element engages the next adjacent detent on the disc; and a second manually rotatable member operatively connected to the carrier and normally holding said carrier against rotation, said second member being rotatable to turn said disc through said carrier for rotating said rotatable element independently of the first mentioned manually operable member.

3. An indexing machine for rotatably indexing a work-piece, said machine consisting of a rotatable member with which a workpiece is adapted to be connected to the work-piece; two separate, manually rotatable actuators for turning the rotatable member, one actuator being permanently connected to said member through motion transmitting mechanism including a disc, the second actuator being operatively connected to said disc by a carrier supporting a retractable detent pin yieldably urged to engage said disc, whereby said second actuator is operative to rotate the disc or to hold it against rotation by said one actuator; and motion transmitting means connecting the said one actuator with the detent pin for retracting the pin to release the disc in response to longitudinal axial movement of said one actuator.

4. An indexing machine for rotatably indexing a work-piece intermittently through a predetermined aliquot portion of an entire revolution thereof, said machine consisting of a gear to which the work-piece may be attached; an actuator manually operable rotatably and in a direction longitudinally of its axis, said actuator being operatively connected to said gear by a train of gearing and a shaft whereby rotation of the actuator will rotate said gear; a disc secured to said shaft to rotate therewith, said disc having a plurality of equally spaced openings arranged in a circular row concentric of the disc, the spacing of the openings being such, that as said disc is rotated through an arc equal to the spacing between adjacent opening, the gearing will have moved the work-piece through one aliquot portion of a complete revolution; a rotatable carrier concentric of the disc; a second manually rotatable actuator operatively connected to said carrier for rotating it; a locking pin slidably carried by the carrier and yieldably urged to enter the respective openings in the disc to lock said disc against rotation by the first-mentioned actuator but rendering said disc rotatable by the second actuator; and means connecting said first mentioned actuator with the locking pin, said means being operative by the axial movement of said first mentioned actuator to withdraw the locking pin from the disc and release it for rotation by said first mentioned actuator until said pin enters the next adjacent opening in the disc.

5. An indexing machine for rotatably indexing a work-piece intermittently through a predetermined aliquot portion of a complete revolution, said machine consisting of a gear to which the work-piece is attachable; longitudinally axially movable and manually rotatable means connected to the gear for rotating it; detent means automatically operative to engage and lock the said rotatable means against rotation when said means has rotated the work-piece through said aliquot portion of a revolution; a second manually rotatable means operatively connected to said first-mentioned manually rotatable means by said detent means for rotating the work-piece any desirable degree; and means connected to the detent means and operatively engageable and movable by the first-mentioned manually rotatable means as it is moved longitudinally axially for disengaging the detent means from the first-mentioned rotatable means to release it for rotative movement.

6. An indexing machine for rotatably indexing a work-piece intermittently through a predetermined aliquot portion of a complete revolution or through any desirable degree of rotation, said machine consisting of a housing; a gear rotatably supported in the housing and having provisions for attaching the work-piece thereto to be rotated thereby; a hollow carrier journaled in said housing and operatively connected to a manually rotatable actuator which is operative to rotate the carrier and to lock the carrier against rotation otherwise; a shaft coaxially journaled in the carrier and having a disc and a pinion secured thereon at one end, said pinion meshing with the gear to which the work is attachable, the other end of said shaft being connected by gearing to a second actuator which is operative both rotatably and longitudinally axially; means attached to the face of the disc adjacent the carrier, said means providing an annular row of predeterminately spaced detents, said spacing being such that when said disc is rotated through an arc equal to said spacing, the pinion on the shaft will have actuated the gear through an arc equal to the said aliquot portion of a complete revolution of the work-piece; a collar slidable on the carrier; a detent pin slidably extending through the carrier and attached to the collar; springs secured to the carrier and collar, said spring yieldably urging the collar to move the detent pin into locking engagement with the respective detents in the disc whereby the disc is held against rotation by the second actuator and rendered rotatable by the first-mentioned actuator; a pivoted, yoke-lever operatively engaging said collar and engageable by the second actuator when it is moved longitudinally axially for moving the collar to retract the detent pin from the detent on the disc and thereby release the disc for rotation by said second actuator.

7. A device in accordance with claim 6 in which the disc is provided with a plurality of openings arranged in an annular row concentric of the carrier and equally spaced so that rotation of the disc through an arc equal to said spacing will effect rotation of the work-piece on the gear through one aliquot part of its entire revolution; a thimble in each disc opening; a segment between each two adjacent thimbles to form a continuous arcuate track between thimbles upon which the detent pin may ride as the disc is rotated by the second actuator; and a motion translating cam interposed between said second actuator and the yoke lever connected to the collar on the carrier.

References Cited in the file of this patent

UNITED STATES PATENTS

| Number | Name | Date |
| --- | --- | --- |
| 1,206,006 | Lifflander | Nov. 28, 1916 |

FOREIGN PATENTS

| Number | Country | Date |
| --- | --- | --- |
| 729,874 | Germany | Jan. 4, 1943 |